(12) United States Patent
Maras

(10) Patent No.: US 8,262,098 B2
(45) Date of Patent: Sep. 11, 2012

(54) ROTARY TOOL SYSTEM WITH CENTERING MEMBER

(75) Inventor: Verica Maras, Schaumburg, IL (US)

(73) Assignee: Robert Bosch GmbH, Stuttgart (DE)

( * ) Notice: Subject to any disclaimer, the term of this patent is extended or adjusted under 35 U.S.C. 154(b) by 1255 days.

(21) Appl. No.: 12/012,814

(22) Filed: Feb. 5, 2008

(65) Prior Publication Data
US 2009/0196700 A1 Aug. 6, 2009

(51) Int. Cl.
*B23B 31/107* (2006.01)
(52) U.S. Cl. ............ 279/75; 279/79; 279/133; 279/137; 279/905
(58) Field of Classification Search .................. 279/75, 279/79, 133, 905, 137; *B23B 31/107*
See application file for complete search history.

(56) References Cited

U.S. PATENT DOCUMENTS

| | | | |
|---|---|---|---|
| 1,602,708 A | 10/1926 | Russell | |
| 1,862,352 A | 6/1932 | Emrick | |
| 3,347,293 A * | 10/1967 | Clark | 81/438 |
| 3,622,169 A | 11/1971 | Koch et al. | |
| 3,708,178 A * | 1/1973 | Lauricella | 279/81 |
| 3,716,247 A * | 2/1973 | Sato | 279/23.1 |
| 4,162,080 A * | 7/1979 | Buck | 279/48 |
| 4,184,692 A | 1/1980 | Benson et al. | |
| 4,231,581 A * | 11/1980 | Benedict | 279/19.4 |
| 4,502,824 A * | 3/1985 | Dohse et al. | 409/234 |
| 4,900,164 A | 2/1990 | Nakamura | |
| 4,900,202 A * | 2/1990 | Wienhold | 408/240 |
| 5,016,892 A | 5/1991 | Lafforgue et al. | |
| 5,694,820 A * | 12/1997 | Erickson et al. | 82/160 |
| 5,927,168 A * | 7/1999 | Needham | 82/160 |
| 6,270,085 B1 * | 8/2001 | Chen et al. | 279/22 |
| 6,325,393 B1 * | 12/2001 | Chen et al. | 279/22 |
| 6,651,990 B2 * | 11/2003 | Higasi et al. | 279/19.4 |
| 6,953,196 B1 * | 10/2005 | Huang | 279/75 |
| 6,966,562 B1 * | 11/2005 | Wienhold | 279/75 |
| 7,121,774 B2 * | 10/2006 | Hirt et al. | 408/240 |
| 7,563,061 B2 * | 7/2009 | Gibbons et al. | 408/240 |
| 2006/0163824 A1 * | 7/2006 | Sasaki et al. | 279/75 |

FOREIGN PATENT DOCUMENTS

| | | |
|---|---|---|
| CN | 1616171 | 5/2005 |
| DE | 934860 | 11/1955 |
| DE | 952582 | 11/1956 |
| EP | 1445051 | 8/2004 |
| WO | 0196052 | 12/2001 |

OTHER PUBLICATIONS

European Search Report in a correspondence European application (i.e. EP 09 15 2070) dated Jun. 9, 2009 (2 pages).

* cited by examiner

*Primary Examiner* — Eric A Gates
(74) *Attorney, Agent, or Firm* — Maginot, Moore & Beck

(57) ABSTRACT

A rotary tool includes a collet which in one embodiment includes a bit holder defining a shank receiving bore, a transfer member for transferring rotational force from the bit holder to the shank of an accessory, and a centering member positioned within the bit holder and configured to automatically grip the shank when the shank is positioned within the shank receiving bore.

19 Claims, 6 Drawing Sheets

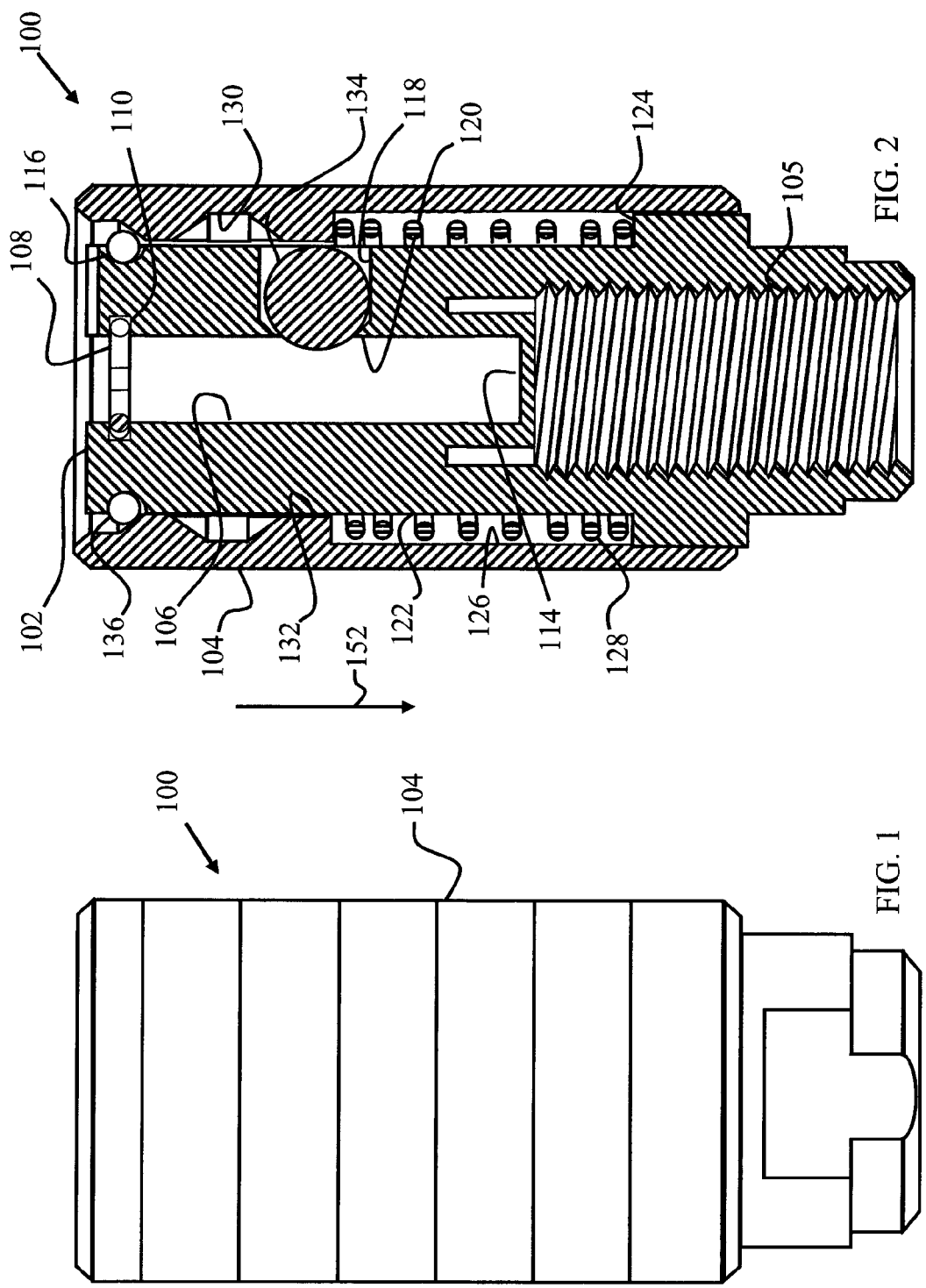

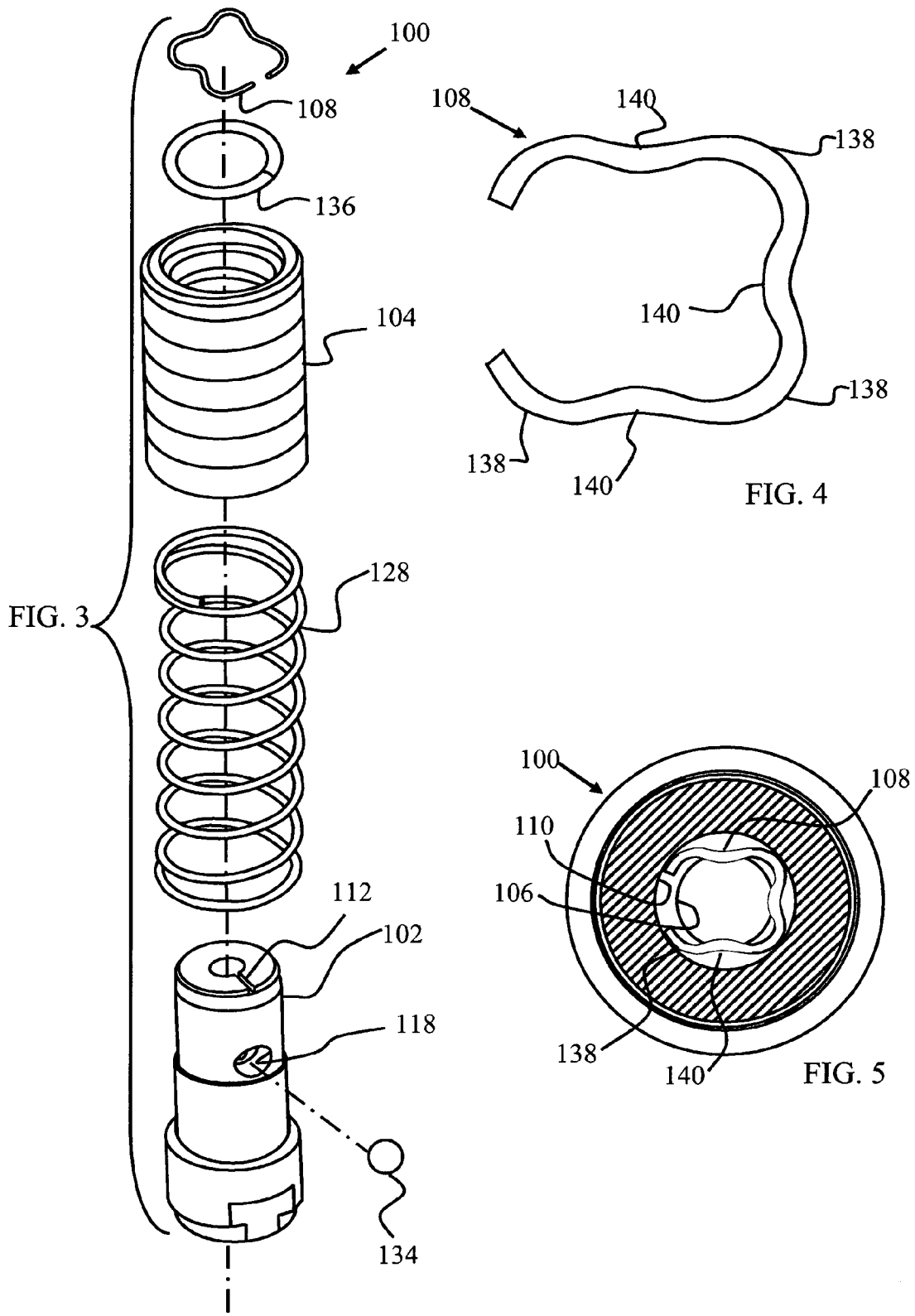

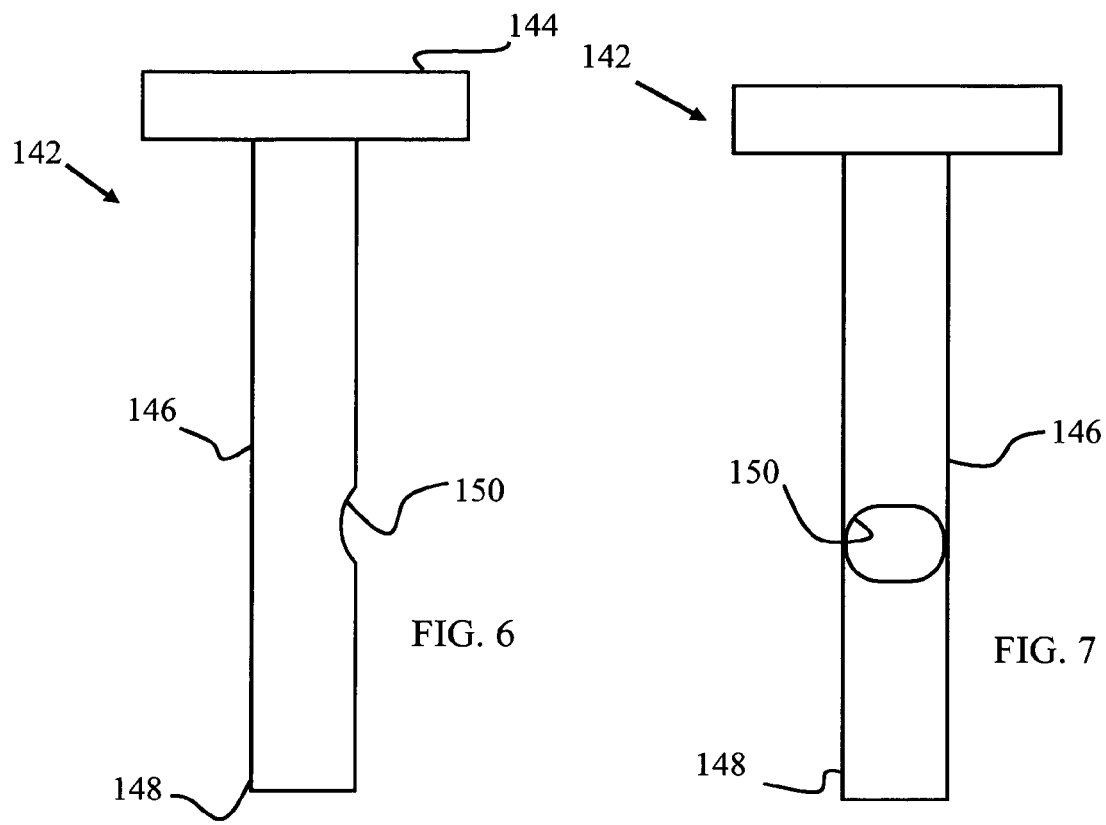
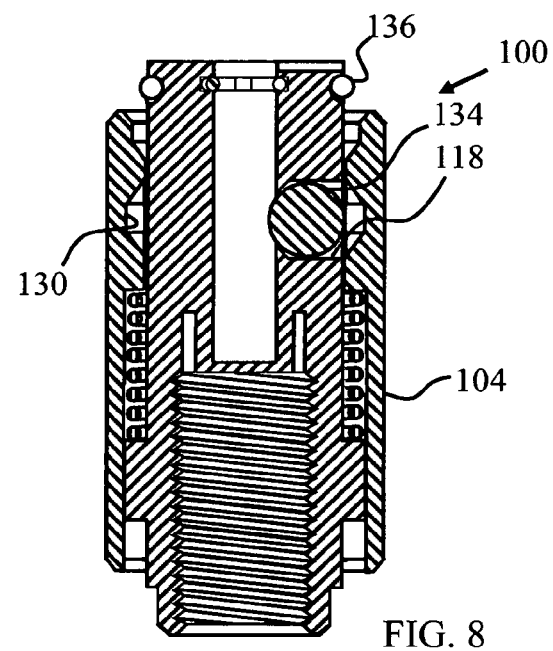

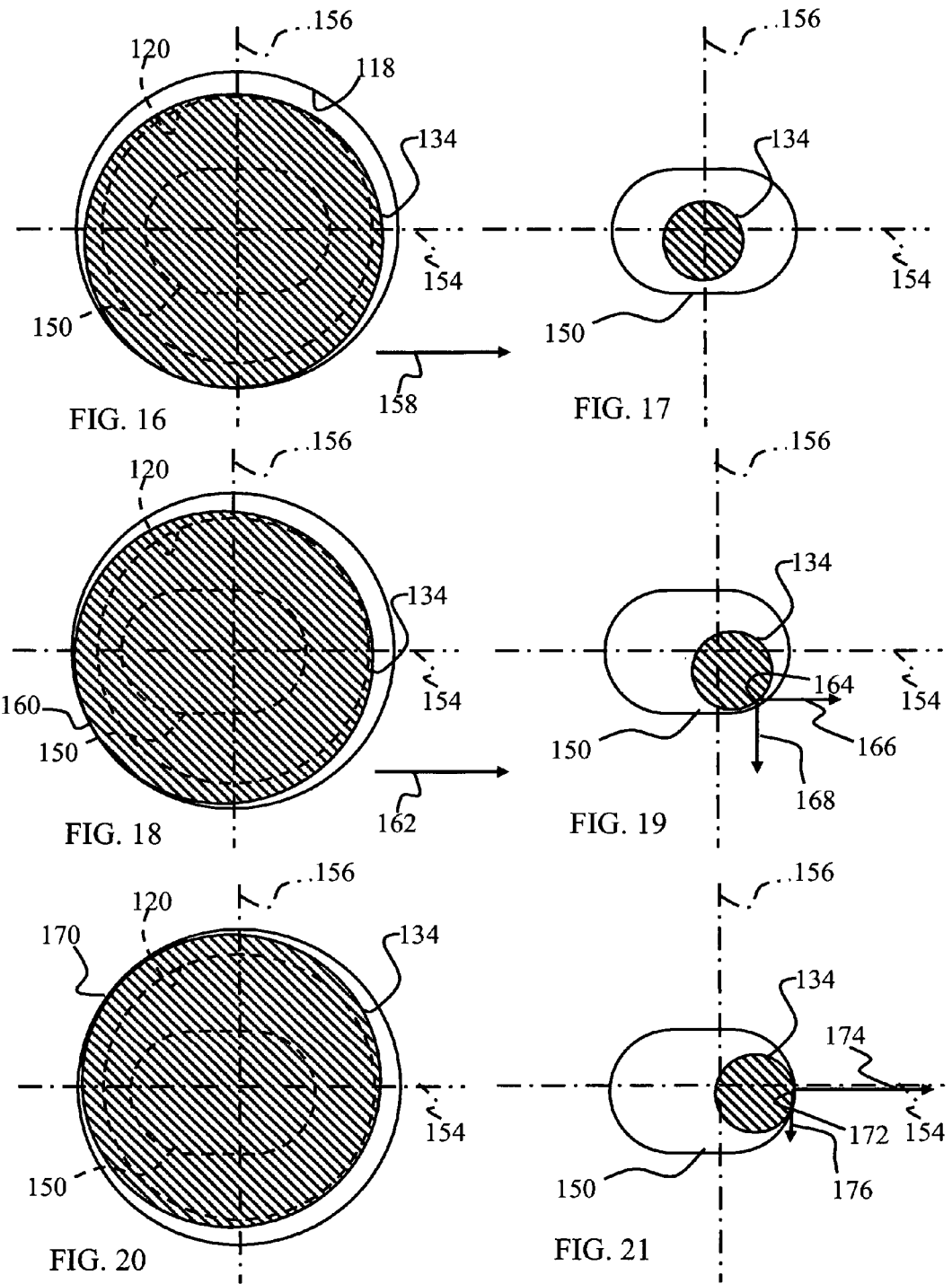

ROTARY TOOL SYSTEM WITH CENTERING MEMBER

FIELD

This invention relates to the field of hand held rotary tools and related accessories.

BACKGROUND

Hand held rotary tools are widely used by many people, including craftspeople, homeowners, and artists. These rotary tools typically include an outer housing designed to be easily held within a human hand. The housing retains an electric motor which is operable to drive a rotatable chuck of the rotary tool. The chuck allows a variety of accessories to be interchangeably used with the rotary tool.

To couple an accessory with the rotary tool, the chuck is rotated by a user to tighten the chuck about the shank of the accessory. The ability of the chuck to retain the shank of the accessory is dependent upon the amount of tightening torque applied by the user. When insufficient tightening torque is applied, the chuck will loosen under load resulting in a loss of control over the accessory which may damage either or both of the work piece and the accessory. To solve this issue, some chucks are provided with components that are tightened using keys or wrenches. While these alternatives allow for a much tighter grip on the shank of the accessory, the use of the alternatives increases the amount of time needed to switch accessories. Moreover, additional components, particularly smaller components such as keys and wrenches, are easily misplaced, leading to lost time in finding the items or in replacing the item.

In response to the problems with the known chuck systems, "quick change" collets were developed. The quick change collets capture a portion of the shank of an accessory within the collet, generally using a spring loaded sleeve which traps a ball bearing within a groove in the shank. The accessory is then driven by a portion of the bit holder within the collet that is shaped complimentary to the accessory shank. A common shape for a shank is that of a hexagon. Quick change collets significantly lower the time required to switch accessories and significantly reduce the potential of the accessory working loose from the rotary tool.

While quick change collets provide a number of benefits, known collet systems suffer from various limitations. One such limitation results from the manner in which the accessory shank is trapped. Specifically, in order to allow for insertion of the shaped shank within the shaped bit holder, the bit holder is necessarily larger than the shank. This results in some amount of play between the shank and the bit holder. As the amount of play increases, the potential for slippage and off-axis movement increases. As the amount of play decreases, the potential that foreign matter will interfere with the proper seating of the shank within the bit holder increases. Thus, a tradeoff is required between ease of use and performance.

Moreover, some amount of play is also required between the ball bearing and the groove in the shank. Thus, some amount of axial looseness between the accessory and the rotary tool is created. This looseness results in undesired axial shifts of the accessory when a load is placed on the rotary tool.

The foregoing limitations are further exacerbated by the engineering tolerances endemic to the production of rotary tool systems. As the tolerances are reduced, the cost of production increases. Accordingly, a tradeoff is required between achieving a cost effective tolerance while optimizing the performance of the system.

Accordingly, it would be advantageous to provide a collet and associated rotary tool system that is quick and easy to use and does not require the use of an additional tool such as a key or a wrench. It would be further advantageous if the collet and associated rotary tool system reduced the looseness of the accessory when the rotary tool is in use. It would also be advantageous if the collet and associated rotary tool system compensated for manufacturing tolerances while not being overly susceptible to inoperability due to the presence of foreign objects.

SUMMARY OF THE INVENTION

In accordance with one embodiment of the present invention, there is provided a collet for use with a rotary tool which includes a bit holder defining a shank receiving bore, a transfer member for transferring rotational force from the bit holder to the shank of an accessory, and a centering member positioned within the bit holder and configured to automatically grip the shank when the shank is positioned within the shank receiving bore.

In accordance with another embodiment, a rotary tool kit includes a rotary tool, an accessory with a shank, and a collet for coupling the accessory with the rotary tool and including a bit holder defining a shank receiving bore, a passage opening to the shank receiving bore at a first end portion and opening to an outer wall of the shank receiving bore at a second end portion, the passage including a first bearing portion and a second bearing portion, a transfer member for transferring rotational force from the bit holder to the accessory and movable within the passage between a first position wherein the transfer member is not in contact with the first bearing portion or the second bearing portion and a second position wherein the transfer member is in contact with both the first bearing portion and the second bearing portion, and a centering member positioned within the bit holder and configured to resiliently deform to grip the shank when the shank is positioned within the shank receiving bore, wherein, rotation of the bit holder about an axis while the shank is received within the shank receiving bore and the transfer member is in the second position and engaged with the shank, causes rotational force about the axis from the bit holder to be transferred to the shank through the transfer member.

In a further embodiment, a method of operating a rotary tool includes deforming a centering member within a shank receiving bore of a bit holder with the shank of an accessory, moving a transfer member into a cavity defined by a cavity wall in the shank, rotating the bit holder in a first direction about an axis, contacting a first portion of the cavity wall with the transfer member and transferring rotational energy in the first direction about the axis from the bit holder to the shank through the transfer member.

BRIEF DESCRIPTION OF THE DRAWINGS

The present invention may take form in various system components and arrangement of system components. The drawings are only for purposes of illustrating exemplary embodiments and are not to be construed as limiting the invention.

FIG. 1 shows a plan view of a collet assembly with a centering member and transfer member for use with a rotary tool incorporating principles of the invention;

FIG. 2 shows a cross sectional view of the collet assembly of FIG. 1 with a transfer member maintained within a passageway in the bit holder by an outer sleeve;

FIG. 3 shows an exploded perspective view of the collet assembly of FIG. 1;

FIG. 4 shows a top plan view of a spring ring which is used as a centering member in the embodiment of FIG. 1;

FIG. 5 shows a cross sectional view of the centering member of FIG. 4 positioned within the bit holder of FIG. 2;

FIG. 6 shows a side plan view of an accessory with a shank having a cavity that may be used with the collet assembly of FIG. 1 in accordance with principles of the invention;

FIG. 7 shows a front plan view of the cavity in the shank of the accessory of FIG. 6;

FIG. 8 shows a cross sectional view of the collet assembly of FIG. 1 with the spring compressed by the outer sleeve aligning a recess in the outer sleeve with the passageway of the bit holder;

FIG. 16 shows a schematic representation of the cross section of the transfer member within the passageway of the collet assembly of FIG. 1 when the collet assembly is not being rotated;

FIG. 17 shows a schematic representation of the cross section of the transfer member of the collet assembly of FIG. 1 within the cavity of the accessory of FIG. 6 when the collet assembly is not being rotated;

FIG. 18 shows a schematic representation of the cross section of the transfer member within the passageway of the collet assembly of FIG. 1 when the collet assembly is initially rotated;

FIG. 19 shows a schematic representation of the cross section of the transfer member of the collet assembly of FIG. 1 within the cavity of the accessory of FIG. 6 wherein the rotation of the collet assembly has caused the transfer member to engage with the shank of the accessory of FIG. 6 to provide rotational force to the accessory;

FIG. 20 shows a schematic representation of the cross section of the transfer member within the passageway of the collet assembly of FIG. 1 wherein the transfer member is engaged with the bit holder to transfer rotational and axial force from the bit holder; and FIG. 21 shows a schematic representation of the cross section of the transfer member of the collet assembly of FIG. 1 within the cavity of the accessory of FIG. 6 wherein the rotation of the collet assembly has caused the transfer member to engage with the shank of the accessory of FIG. 6 to transfer radial and axial force.

DESCRIPTION

Figure 9:
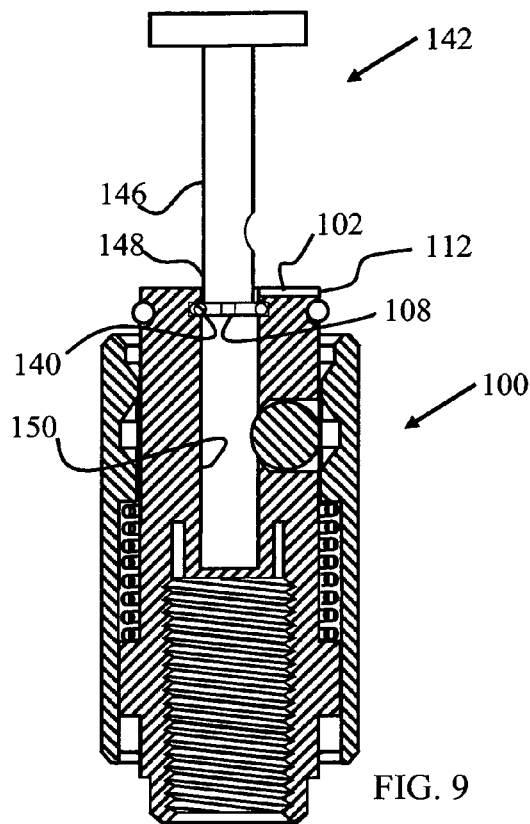
FIG. 9 shows a cross sectional view of the collet assembly of FIG. 1 with the accessory of FIG. 6 partially inserted within the shank receiving bore of the bit holder so as to contact the centering member that protrudes into the shank receiving bore.

A collet assembly 100 for use with a rotary tool is shown in FIGS. 1-3. The collet assembly 100 includes a bit holder 102 and an outer sleeve 104. The bit holder 102 includes a threaded coupling portion 105 and a shank receiving bore 106. A centering member 108 is maintained in position within the shank receiving bore 106 by a groove 110. A slot 112 is located at the upper end of the bit holder 102 and extends from the shank receiving bore 106 which terminates at an end portion 114. A passageway 118 opens to the shank receiving bore 106 at one end through a taper portion 120 and opens through the outer wall 122 of the of the bit holder 102 at the other end. A groove 116 circumscribes the outer wall 122 at the upper end while a retaining shoulder 124 extends outwardly from the outer wall 122 at the lower end of the outer wall 122.

The outer sleeve 104 along with the outer wall 122 of the bit holder 102 defines a spring cavity 126. A spring 128 is located within the spring cavity 126. A recess 130 extends about the inner wall 132 of the outer sleeve 104.

The collet assembly 100 further includes a transfer member 134 and a warning ring 136. The transfer member 134, which in this embodiment is a ball bearing, is located within the passageway 118. The warning ring 136 is located between the bit holder 102 and the outer sleeve 104 within the groove 116.

With further reference to FIGS. 4 and 5, the centering member 108 in this embodiment is an open ring which includes outer elbows 138 interleaved with inner elbows 140. Opposing pairs of outer elbows 138 such as the outer elbows 138 located at the top right and the bottom left of the centering member 108 as depicted in FIG. 4 define a diameter that is larger than the diameter of the shank receiving bore 106 as best shown in FIG. 5. Additionally, opposing pairs of inner elbows 140 such as the inner elbows 140 located at the top and the bottom of the centering member as depicted in FIG. 4 define a diameter that is less than the diameter of the shank receiving bore 106. Accordingly, when the centering member 108 is held by the groove 110, the outer elbows 138 abut the bit holder 102 within the groove 110 and the inner elbows 140 protrude into the shank receiving bore 106.

The collet assembly 100 may be used with an accessory 142 which is shown in FIGS. 6 and 7. The accessory 142 includes a work portion 144 and a shank 146. The shank 146 includes a plug end portion 148 and a cavity 150.

In operation, the collet assembly 100 may be attached to a rotary tool (not shown) using the threaded coupling bore 115. Alternatively, the collet assembly 100 may be permanently attached to a rotary tool. In either case, operation of the collet assembly 100 may commence with the collet assembly 100 in the condition depicted in FIG. 2. Next, a user grips the outer sleeve 104 and applies force in the direction in the arrow 152 of FIG. 2. When the applied force exceeds the biasing force of the spring 128, the outer sleeve 104 moves in the direction of the arrow 152 compressing the spring 128 against the retaining shoulder 124 until the collet assembly 100 is in the condition depicted in FIG. 8.

As shown in FIG. 8, the recess 130 is generally aligned with the passageway 118 and the warning ring 136 is exposed above the outer sleeve 104. The plug end portion 148 of the accessory 142, is then placed into the shank receiving bore 106. The plug end portion 148 has a diameter that is larger than the diameter defined by the inner elbows and less than the diameter of the shank receiving bore 106. Thus, referring to FIG. 9, as the shank 146 is inserted into the shank receiving bore 106, the plug end portion 148 of the accessory 142 contacts the inner elbows 140 of the centering member 108 which protrude into the shank receiving bore 106.

The centering member 108 is made of a resilient material. Additionally, the centering member 108 does not extend completely around the groove 110 because of the opening between the outer elbows 138. Accordingly, as the plug end portion 148 contacts the inner elbows 140, the inner elbows 140 are forced in the direction outwardly of the shank receiving bore 106. As the inner elbows 140 move outwardly, the shank 146 moves past the centering member 108.

Figure 10:
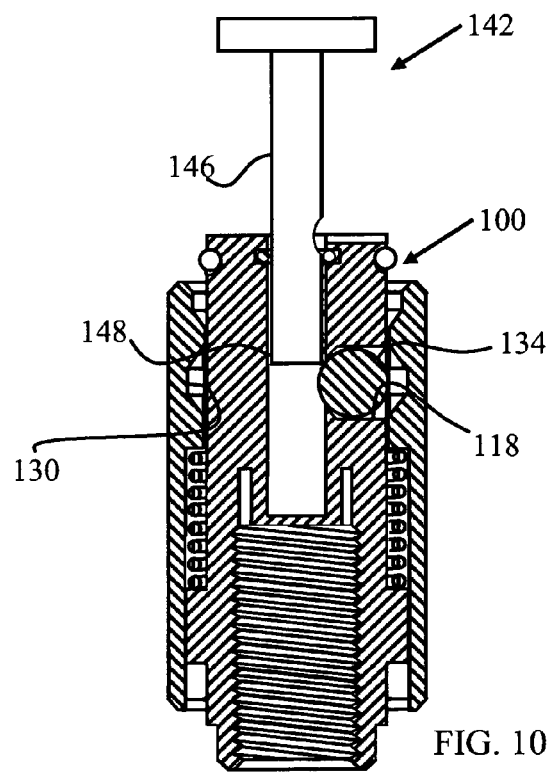
FIG. 10 shows a cross sectional view of the collet assembly of FIG. 1 with the accessory of FIG. 6 partially inserted within the shank receiving bore of the bit holder so as to contact the portion of the transfer member that is within the shank receiving bore.

Referring to FIG. 10, continued insertion of the shank 146 into the shank receiving bore 106 causes the plug end portion 148 of the accessory 142 to contact the transfer member 134. Because the recess 130 is aligned with the passageway 118, the transfer member 134 is forced out of the shank receiving bore 106 and partially into the recess 130, allowing the plug end portion 148 to move beyond the passageway 118 as shown in FIG. 11.

Figure 11:
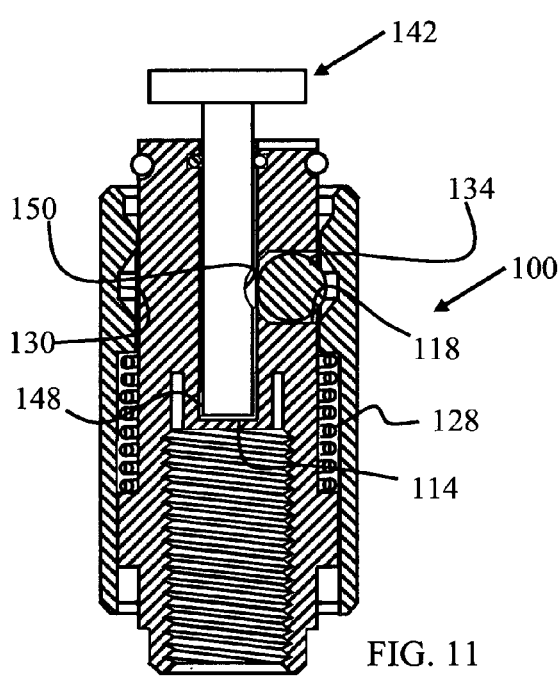
FIG. 11 shows a cross sectional view of the collet assembly of FIG. 1 with the transfer member pushed out of the shank receiving bore and partially into the recess of the outer sleeve, thus allowing the shank of the accessory to be further inserted into the shank receiving bore of the bit holder.
Figure 12:
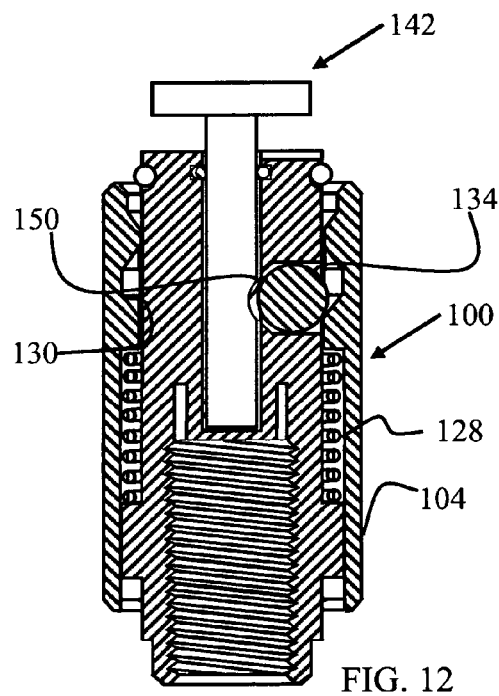
FIG. 12 shows a partial cross sectional view of the collet assembly of FIG. 1 with the shoulder of the recess contacting the transfer member free.

Continuing with FIG. 11, as the plug end portion 148 approaches the end portion 114, the cavity 150 is positioned adjacent to the passageway 118. Accordingly, the transfer member 134 is free to move out of the recess 130 and into the cavity 150. The force applied to the outer sleeve 104 may then be released, allowing the spring 128 to push the sleeve 104 upwardly from the position shown in FIG. 11 to the position shown in FIG. 12.

Figure 13:
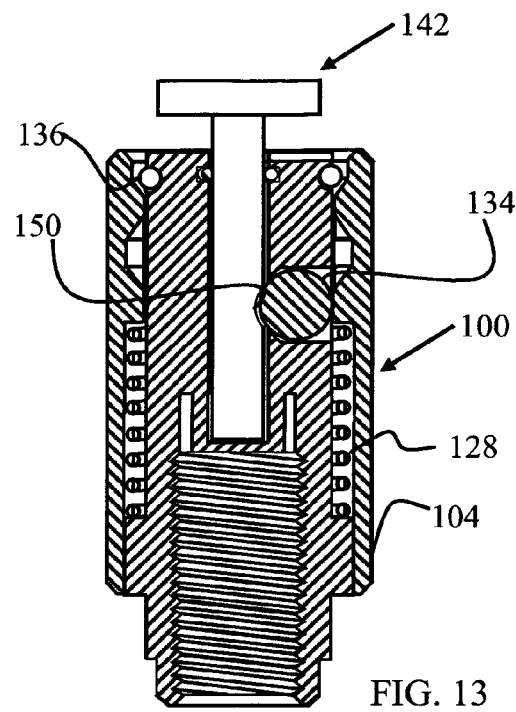
FIG. 13 shows a cross sectional view of the collet assembly of FIG. 1 with the transfer member trapped within the passageway of the bit holder and partially within the cavity of the accessory of FIG. 4 by the outer sleeve.

In the event the transfer member 134 did not move into the cavity 150 before the force applied to the outer sleeve 104 by the user was released, the lower tapered portion of the recess 130 will act upon the transfer member 134 forcing the transfer member 134 out of the recess 130 and partially into the cavity 150. In either event, the outer sleeve 104 is forced upwardly by the spring 128 until the outer sleeve 104 covers the warning ring 136 as shown in FIG. 13.

The slot 112 is used to ensure that the cavity 150 is generally aligned radially with the passageway 118. Alternatively, the accessory 142 and the collet assembly 100 may be keyed or otherwise marked to assist in alignment if the accessory 142 and the collet assembly 100. In the event the cavity 150 is not generally aligned with the passageway 118, the transfer member 134 will not be able to move into the cavity 150. Accordingly, as the force applied to the outer sleeve 104 by the user is released, the lower tapered portion of the recess 130 will act upon the transfer member 134 forcing the transfer member 134 against the shank 146. Therefore, the movement of the outer sleeve 104 caused by the spring 128 will be stopped and the outer sleeve 104 will be in the position shown in FIG. 14.

Figure 14:
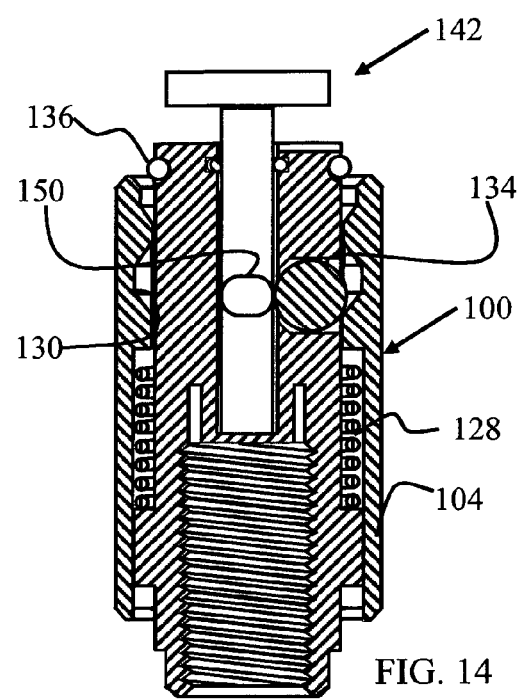
FIG. 14 shows a cross sectional view of the collet assembly of FIG. 1 with the transfer member trapped within the passageway of the bit holder by the shank of the accessory of FIG. 4 and the shoulder of the recess of the outer sleeve as occurs when the cavity of the shank of the accessory is not aligned with the passageway and the outer sleeve is released by a user, thereby leaving a warning ring exposed.

As shown in FIG. 14, the warning ring 136 is exposed above the top of the outer sleeve 104. This provides a warning to the user that the accessory 142 is not properly inserted within the collet assembly 100. Accordingly, the user rotates the accessory 142 until the cavity 150 aligns with the recess 130 at which time the continued biasing of the spring 128 against the outer sleeve 104 will force the lower tapered portion of the recess 130 against the transfer member 134. Thus, the transfer member 134 is forced partially into the cavity 150 and out of the recess 130. The outer sleeve 104 will then continue to move under the biasing force of the spring 128 to the position shown in FIG. 13 wherein the warning ring 136 is covered by the outer sleeve 104.

Figure 15:
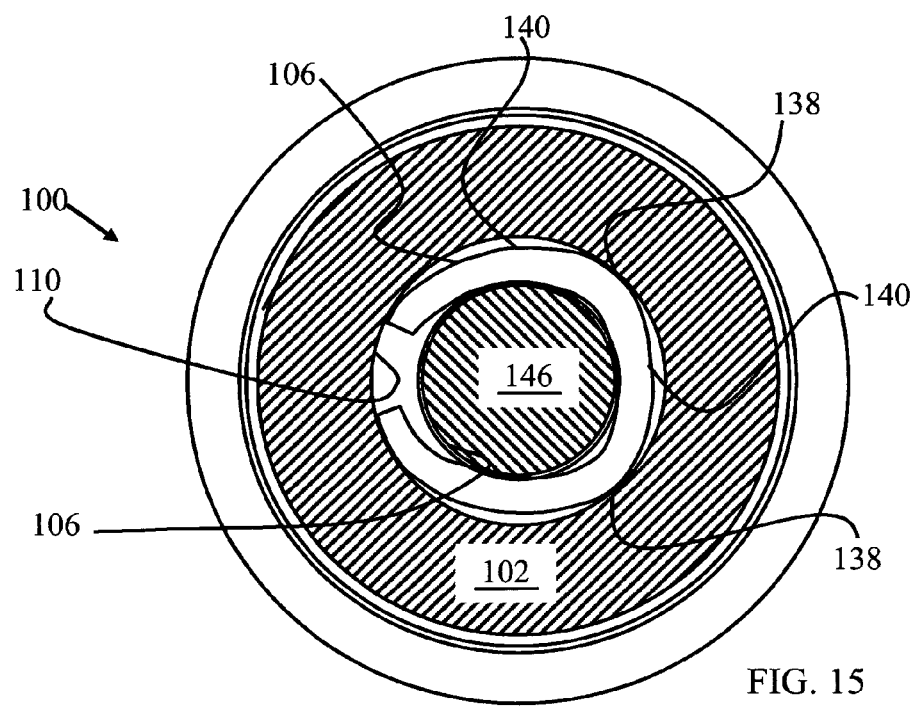
FIG. 15 shows a cross sectional view of the centering member of FIG. 4 positioned within the bit holder of FIG. 2 with the accessory of FIG. 6 deforming the centering member of FIG. 4 thereby centering the shank of the accessory within the shank receiving bore.

When the transfer member 134 is received within the cavity 150, the shank 146 is centered within the shank receiving bore 106 by the centering member 108. As discussed above, the insertion of the shank 146 into the shank receiving bore 106 forces the inner elbows 140 outwardly from the position shown in FIG. 5 to the position shown in FIG. 15. In FIG. 15, the outer elbows 138 are pressed tightly against the wall of the groove 110 of the shank receiving bore 106 and the inner elbows 140 are pressed tightly against the shank 146. The centering member 108 in this embodiment thus clamps the shank 144 between three pressure points.

While the accessory 142 is tightly centered, the end portion 148 of the accessory 142 may not be solidly engaged within the shank receiving bore 106. For example, FIG. 16 is a schematic view of the transfer member 134 held within the passageway 118 by the taper portion 120 with the reference lines 154 and 156 indicating the center of the passageway 118. In order to allow the transfer member 134 to move within the passageway 118, a difference in radius between the transfer member 134 and the passageway 118 is provided. Accordingly, when the collet assembly 100 is in the condition shown in FIG. 14, the transfer member 134 will settle to the lowest part of the passageway 118. Thus, there is looseness or play between the transfer member 134 and the bit holder 102.

FIG. 17 schematically depicts a position of the portion of the transfer member 134 that is within the cavity 150 when the collet assembly 100 is not being rotated. The transfer member 134, while within the cavity 150, is not touching the shank 146 in this embodiment. Thus, there is looseness or play between the transfer member 134 and the shank 146.

As the rotary tool motor begins to rotate, the bit holder 102, which is coupled to the rotary tool motor, moves in the direction of the arrow 158 in FIG. 16. Because the transfer member 134 is not firmly engaged with the bit holder 102 within the passageway 118, the transfer member 134 does not initially move in tandem with the passageway 118. Thus, a bearing portion 160 of the passageway 118 is rotated into contact with the transfer member 134 causing the transfer member 134 to rotate along with the bit holder 102 as depicted in FIG. 18. Rotational force is thus transferred to the transfer member 134 through the bearing portion 160.

Accordingly, both the bit holder 102 and the transfer member 134 rotate in the direction of the arrow 162 shown in FIG. 18. Because the transfer member 134 is not firmly engaged with the shank 146 within the cavity 150, the shank 146 does not initially move in tandem with the transfer member 134. Thus, the transfer member 134 is rotated into contact with the shank 146 at a contact point 164 within the cavity 150 as shown in FIG. 19.

The orientation of the bearing member 134 and the shank 146 at the contact point 164 produces a both a rotational vector 166 along the reference line 154 as well as a compressive vector 168 along the reference line 156. As depicted in FIG. 19, the transfer member 134 is not initially restricted from moving upwardly. Thus, the compressive vector 168 effectively generates an upward force upon the transfer member 134 causing the transfer member 134 to rise within the passageway 118 until the transfer member 134 contacts the bearing portion 170 of the passageway 118 shown in FIG. 20. The bearing portion 170 of the passageway 118 limits the movement of the transfer member 134 along the longitudinal axis of the collet assembly 100.

As the transfer member 134 moves axially, and even when the transfer member 134 is positioned against the bearing portion 170, the orientation of the bearing member 134 and the shank 146 at the contact point 164 continues to produce both a rotational vector 166 along the reference line 154 as well as a compressive vector 168 along the reference line 156. Thus, when the transfer member 134 is axially constrained against the bearing portion 170, a compressive force is generated which is transferred from the bearing portion 170 to the transfer member 134 and into the shank 146 at the contact point 164. This produces a force on the accessory 142 biasing the shank 146 farther into the shank receiving bore 106.

As the shank 146 is forced farther into the shank receiving bore 106, the cavity 150 moves with respect to the transfer member 134. Thus, contact between the transfer member 134 and the shank 146 shifts from the contact point 164 toward the contact point 172 shown in FIG. 21. The orientation of the bearing member 134 and the shank 146 at the contact point 172 results in a rotational vector 174 along the reference line 154 as well as a compressive vector 176 along the reference line 156. The rotational vector 174, however, is larger than the rotational vector 166 while the compressive vector 176 is smaller than the compressive vector 168. Thus, as the accessory 142 is more firmly engaged axially with the bit holder 102, more force is available for rotation of the accessory 142.

Preferably, the movement of the shank 146 into the shank receiving bore 106 and the movement of the contact point from the contact point 164 toward the contact point 172 continues until the plug end portion 148 is firmly wedged against the end portion 114. The transfer member 134 thus engages the accessory 142 and the collet assembly 100 to provide transfer of axial as well as radial force.

Alternatively, the movement of the shank 146 into the shank receiving bore 106 and the movement of the contact point from the contact point 164 in an upwardly direction will terminate when the contact point is collocated with the point on the cavity 150 that is contacted by a line tangential to the cavity 150 at the point where the reference line 154 intersects the transfer member 134 and the cavity 150. In this configuration, there is no compressive force on the shank 146; however, any movement of the shank 146 in a direction outwardly of the shank receiving bore 106 is inhibited.

While the foregoing example was provided with respect to a rotation in the direction of the arrow 158, the same sequence occurs when the rotation of the rotary tool is reversed. Accordingly, the transfer member 134 provides engagement for radial and axial transfer of force for both directions of rotation of the rotary tool. Moreover, the initial conditions of the system may be varied, thereby eliminating certain steps. For example, the transfer member 134 may initially be engaged with the bit holder 102 and the accessory 142 to provide for the transfer of radial force. Thus, initial rotation of the collet assembly 100 may cause rotation of the accessory as well as rising of the transfer member 134 within the passageway 118.

Additionally, the actual clearances and shapes of the various components may be modified. For example, the shape of the bearing portion 160 and the bearing portion 170 in the embodiment of FIG. 1 is complimentary to the shape of the transfer member 132. This provides a large surface area through which axial and radial forces may be passed from the bit holder 102 to the accessory 140. Other shapes, however, may be used. By way of example, the passageway 118 may exhibit a circular or rectangular cross section, thus changing the amount of surface area of the transfer member that is in contact with the bit holder. Thus, for systems which do not require a large surface area to provide the desired amount of force, a passageway may simply be formed by drilling a hole in the bit holder.

Likewise, the dimensions, both depth and cross section, of the cavity 150 may be selected to provide the desired amount of engagement to give the desired transfer of force, both axially and radially, between the shank 146 and the bit holder 102. Thus, the design of the collet assembly 100 may be selected to provide a robust capability to overcome design and production inaccuracies and to provide solid engagement for the transfer of force both radially and axially between the collet assembly 100 and a work piece.

Although the present invention has been described with respect to certain preferred embodiments, it will be appreciated by those of skill in the art that other implementations and adaptations are possible. Moreover, there are advantages to individual advancements described herein that may be obtained without incorporating other aspects described above. Therefore, the spirit and scope of the appended claims should not be limited to the description of the preferred embodiments contained herein.

What is claimed is:

1. A collet for use with a rotary tool comprising:
   a bit holder defining a shank receiving bore;
   a passage opening to the shank receiving bore at a first end portion and opening to an outer wall of the bit holder at a second end portion, the passage including a first upper bearing portion and a first lower bearing portion;
   a transfer member movable within the passage between a first position whereat the transfer member is in contact with the first upper bearing portion but not the first lower bearing portion and a second position whereat the transfer member is in contact with the first lower bearing portion but not the first upper bearing portion; and
   a sleeve movable between an upper position whereat the transfer member is forced at least partially into a cavity of a shank when the shank is in the shank receiving bore and a lower position whereat the transfer member is free to move out of the cavity when the shank is in the shank receiving bore,
   wherein the passage and the transfer member are configured such that when the bit holder is rotated in a first direction and the transfer member is in the second position, rotational force is transferred to the shank through the transfer member, and when the bit holder is rotated in the first direction and the transfer member is in the first position, rotational force is transferred to the shank through the transfer member and an axial force is placed on the shank biasing the shank in a direction downwardly into the shank receiving bore.

2. The collet of claim 1, further comprising:
   a centering member positioned within the shank receiving bore and configured to resiliently deform to grip the shank when the shank is positioned within the shank receiving bore.

3. The collet of claim 2, wherein:
   the shank receiving bore comprises a groove circumscribing the shank receiving bore; and
   the centering member comprises a plurality of inner elbows and a plurality of outer elbows, the plurality of outer elbows configured to fit within the groove.

4. The collet of claim 3, wherein the plurality of inner elbows comprises at least one pair of opposing inner elbows, the at least one pair of opposing inner elbows defining a diameter that is smaller than the diameter of the shank receiving bore.

5. The collet of claim 4, wherein the plurality of outer elbows comprises at least one pair of opposing outer elbows, the at least one pair of opposing outer elbows defining a diameter that is larger than the diameter of the shank receiving bore.

6. The collet of claim 5, wherein the centering member is an open ring.

7. The collet of claim 1, wherein:
the passage further includes a second upper bearing portion spaced apart from the first upper bearing portion and a second lower bearing portion spaced apart from the first lower bearing portion;
the transfer member is further movable within the passage between a third position whereat the transfer member is in contact with the second upper bearing portion but not the second lower bearing portion and a fourth position whereat the transfer member is in contact with the second lower bearing portion but not the second upper bearing portion; and
the passage and the transfer member are configured such that when the bit holder is rotated in a second direction and the transfer member is in the fourth position, rotational force is transferred to the shank through the transfer member, and when the bit holder is rotated in the second direction and the transfer member is in the third position, rotational force is transferred to the shank through the transfer member and an axial force is placed on the shank biasing the shank in a direction downwardly into the shank receiving bore.

8. A rotary tool kit comprising:
a rotary tool;
an accessory with a shank, a cavity formed in the shank;
a bit holder defining a shank receiving bore;
a passage opening to the shank receiving bore at a first end portion and opening to an outer wall of the bit holder at a second end portion, the passage including a forward upper bearing portion and a forward lower bearing portion;
a transfer member movable within the passage between a first forward position wherein the transfer member is in contact with the forward upper bearing portion but not the forward lower bearing portion and a second forward position wherein the transfer member is in contact with the forward lower bearing portion but not the forward upper bearing portion; and
a sleeve movable between an upper position whereat the transfer member is forced at least partially into the cavity when the shank is in the shank receiving bore and a lower position whereat the transfer member is free to move out of the cavity when the shank is in the shank receiving bore, wherein the passage, the transfer member, and the cavity are configured such that when the bit holder is rotated in a forward direction and the transfer member is in the first forward position, forward rotational force is transferred to the shank through the transfer member, and when the bit holder is rotated in the first forward direction and the transfer member is in the second forward position, forward rotational force is transferred to the shank through the transfer member and an axial force is placed on the shank biasing the shank in a direction further into the shank receiving bore.

9. The rotary tool kit of claim 8, wherein:
the shank receiving bore comprises a groove; and
a centering member comprises a spring ring configured to fit at least partially within the groove and to protrude from the groove into the shank receiving bore.

10. The rotary tool kit of claim 9, wherein:
the spring ring is configured to provide at least three pressure points on a shank inserted within the shank receiving bore.

11. The rotary tool kit of claim 8, wherein:
the passage further includes a rearward upper bearing portion spaced apart from the forward upper bearing portion and a rearward lower bearing portion spaced apart from the forward lower bearing portion;
the transfer member is further movable within the passage between a third position whereat the transfer member is in contact with the rearward upper bearing portion but not the rearward lower bearing portion and a fourth position whereat the transfer member is in contact with the rearward lower bearing portion but not the rearward upper bearing portion; and
the passage and the transfer member are configured such that when the bit holder is rotated in a rearward direction and the transfer member is in the fourth position, rearward rotational force is transferred to the shank through the transfer member, and when the bit holder is rotated in the rearward direction and the transfer member is in the third position, rearward rotational force is transferred to the shank through the transfer member and an axial force is placed on the shank biasing the shank in a direction downwardly into the shank receiving bore.

12. The rotary tool kit of claim 11, wherein:
the cavity has a maximum radial length about an outer periphery of the shank and a maximum axial length along a longitudinal axis of the shank; and
the maximum radial length is longer than the maximum axial length.

13. The rotary tool kit of claim 12, further comprising:
a centering member positioned within the shank receiving bore and configured to resiliently deform to grip the shank when the shank is positioned within the shank receiving bore.

14. The rotary tool kit of claim 13, wherein:
the shank receiving bore comprises a groove; and
the centering member comprises a spring ring configured to fit at least partially within the groove and to protrude from the groove into the shank receiving bore.

15. The rotary tool kit of claim 14, wherein:
the spring ring is configured to provide at least three pressure points on a shank inserted within the shank receiving bore.

16. The rotary tool kit of claim 13, wherein:
the shank receiving bore comprises a groove circumscribing the shank receiving bore; and
the centering member comprises a plurality of inner elbows and a plurality of outer elbows, the plurality of outer elbows configured to fit within the groove.

17. The rotary tool kit of claim 16, wherein the plurality of inner elbows comprises at least one pair of opposing inner elbows, the at least one pair of opposing inner elbows defining a diameter that is smaller than the diameter of the shank receiving bore.

18. The rotary tool kit of claim 17, wherein the plurality of outer elbows comprises at least one pair of opposing outer elbows, the at least one pair of opposing outer elbows defining a diameter that is larger than the diameter of the shank receiving bore.

19. The rotary tool kit of claim 18, wherein the centering member is an open ring.

* * * * *